(12) United States Patent
Sun et al.

(10) Patent No.: US 10,939,394 B2
(45) Date of Patent: Mar. 2, 2021

(54) MEASUREMENT SYNCHRONIZATION SIGNALS (SS)

(71) Applicant: QUALCOMM Incorporated, San Diego, CA (US)

(72) Inventors: Jing Sun, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 122 days.

(21) Appl. No.: 16/024,950

(22) Filed: Jul. 2, 2018

(65) Prior Publication Data

US 2019/0037508 A1 Jan. 31, 2019

Related U.S. Application Data

(60) Provisional application No. 62/538,629, filed on Jul. 28, 2017.

(51) Int. Cl.
| | |
|---|---|
| *H04W 56/00* | (2009.01) |
| *H04L 27/26* | (2006.01) |
| *H04J 11/00* | (2006.01) |
| *H04L 5/00* | (2006.01) |
| *H04W 48/12* | (2009.01) |
| *H04W 72/04* | (2009.01) |

(52) U.S. Cl.
CPC ....... *H04W 56/001* (2013.01); *H04J 11/0069* (2013.01); *H04L 5/0053* (2013.01); *H04L 27/2611* (2013.01); *H04L 27/2626* (2013.01); *H04W 48/12* (2013.01); *H04W 72/0453* (2013.01)

(58) Field of Classification Search
CPC .......... H04W 56/001; H04W 72/0453; H04W 48/12; H04J 11/0069; H04L 27/2611; H04L 27/2626; H04L 5/0053
See application file for complete search history.

(56) References Cited

U.S. PATENT DOCUMENTS

| | | | |
|---|---|---|---|
| 2011/0274097 A1* | 11/2011 | Zhang | H04W 24/02 370/338 |
| 2012/0243638 A1 | 9/2012 | Maltsev et al. | |
| 2017/0311276 A1 | 10/2017 | Tsai et al. | |
| 2017/0359791 A1 | 12/2017 | Onggosanusi et al. | |
| 2018/0048413 A1 | 2/2018 | Liu et al. | |
| 2018/0049113 A1 | 2/2018 | Jung et al. | |
| 2018/0084593 A1 | 3/2018 | Chen et al. | |
| 2018/0198659 A1* | 7/2018 | Ko | H04L 27/2662 |
| 2018/0262308 A1* | 9/2018 | Si | H04L 27/2613 |
| 2018/0324022 A1* | 11/2018 | Sheng | H04W 36/0061 |
| 2019/0053138 A1* | 2/2019 | Wu | H04W 24/10 |

(Continued)

FOREIGN PATENT DOCUMENTS

EP 3471479 A1 4/2019

OTHER PUBLICATIONS

International Search Report and Written Opinion—PCT/US2018/040789—ISA/EPO—dated Oct. 10, 2018.

(Continued)

*Primary Examiner* — Mehmood B. Khan
(74) *Attorney, Agent, or Firm* — Patterson & Sheridan, LLP

(57) ABSTRACT

Aspects of the present disclosure relate to techniques for transmitting and processing synchronization signals (SS) for different purposes.

22 Claims, 11 Drawing Sheets

(56) References Cited

U.S. PATENT DOCUMENTS

| | | | |
|---|---|---|---|
| 2019/0103931 A1* | 4/2019 | Yi | H04B 7/0639 |
| 2019/0132066 A1* | 5/2019 | Park | H04W 36/0079 |
| 2019/0140880 A1* | 5/2019 | Li | H04W 48/12 |
| 2019/0149383 A1* | 5/2019 | Ko | H04W 72/04 |
| | | | 370/329 |
| 2019/0173659 A1* | 6/2019 | Liu | H04W 4/80 |
| 2019/0246426 A1* | 8/2019 | Kim | H04W 72/0453 |
| 2019/0335517 A1* | 10/2019 | Reial | H04W 16/28 |
| 2019/0363809 A1* | 11/2019 | Yoon | H04W 56/00 |

OTHER PUBLICATIONS

LG Electronics: "Consideration on NR-PBCH contents and payload size", 3GPP Draft; R1-1710262, LG_Consideration on NR-PBCH Contents and Payload Size, 3rd Generation Partnership Project (3GPP), Mobile Competence Centre; 650, Route Des Lucioles; F-06921 Sophia-Antipolis Cedex, vol. RAN WG1, no. Qingdao, P.R. China; Jun. 27, 2017-Jun. 30, 2017, Jun. 17, 2017 (Jun. 17, 2017), XP051304894, 9 pages, Retrieved from the Internet: URL: http://www.3gpp.org/ftp/tsg_ran/WG1_RL1/TSGR1_AH/NR_AH_1706/Docs/ [retrieved on Jun. 17, 2017].

LG Electronics: "MIB Contents", 3GPP TSG-RAN WG2 NR AH#2, 3GPP Draft; R2-1707177, Qingdao, China, Jun. 27-29, 2017, pp. 1-4.

LG Electronics: "Remaining Issues on Multiple SS Block Transmissions in Wideband CC", 3GPP TSG RAN WG1 Meeting NR#2, 3GPP Draft; R1-1710261, Qingdao, P.R. China, Jun. 27-30, 2017, 4 Pages.

Mediatek Inc: "Discussion on PBCH Contents", 3GPP TSG RAN WG1 Meeting Ad-Hoc#2, 3GPP Draft; R1-1710797, Qingdao, P.R. China, Jun. 27-30, 2017, pp. 1-3.

* cited by examiner

MEASUREMENT SYNCHRONIZATION SIGNALS (SS)

CLAIM OF PRIORITY UNDER 35 U.S.C. § 119

This application claims the benefit of U.S. Provisional Patent Application Ser. No. 62/538,629, filed Jul. 28, 2017, which is herein incorporated by reference in its entirety.

INTRODUCTION

Aspects of the present disclosure relate to wireless communications, and more particularly, to the use of synchronization signals (SS) for different purposes.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In a Long Term Evolution (LTE) or LTE Advanced (LTE-A) network, a set of one or more base stations may define an eNodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, gNB, gNodeB, etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a need for further improvements in NR technology. Preferably, these improvements should be applicable to other multi-access technologies and the telecommunication standards that employ these technologies.

SUMMARY

As described herein, certain wireless systems may employ directional beams for transmission and reception.

Certain aspects of the present disclosure provide a method for wireless communication that may be performed, for example, by a network entity. The method generally includes transmitting at least one first set of synchronization signal (SS) blocks in a first frequency band for one or more user equipments (UEs) to use for initial access and transmitting at least one second set of SS blocks in a second frequency band for measurement purposes, wherein a physical broadcast channel (PBCH) payload of SS blocks of the first set is different than a PBCH payload of SS blocks of the second set.

Certain aspects of the present disclosure provide a method for wireless communication that may be performed, for example, by a UE. The method generally includes performing initial access to a network based on at least one first set of synchronization signal (SS) blocks received in a first frequency band and performing measurements based on at least one second set of SS blocks received in a second frequency band, wherein a physical broadcast channel (PBCH) payload of SS blocks of the first set is different than a PBCH payload of SS blocks of the second set.

Aspects generally include methods, apparatus, systems, computer readable mediums, and processing systems, as substantially described herein with reference to and as illustrated by the accompanying drawings.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
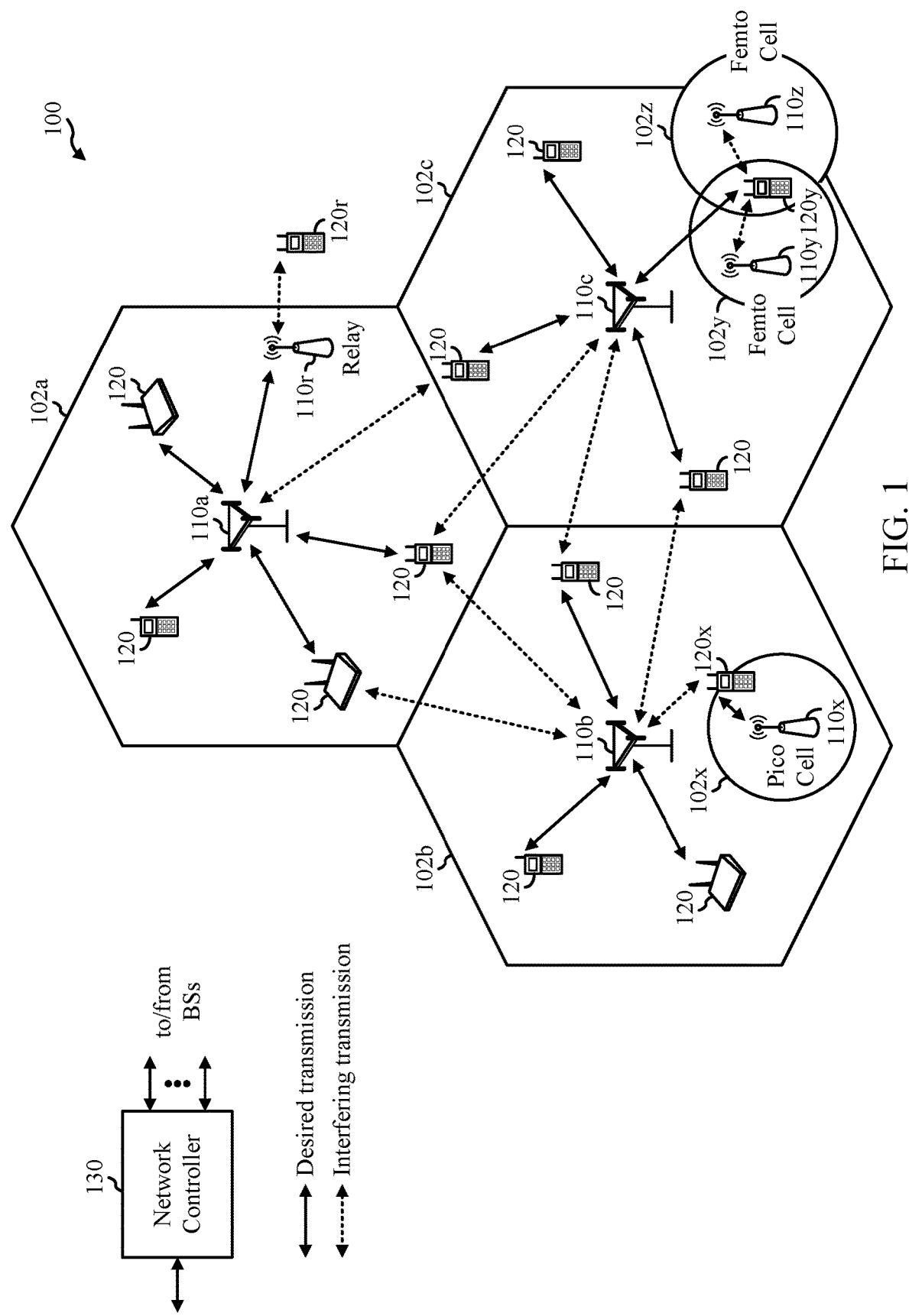
FIG. 1 is a block diagram conceptually illustrating an example telecommunications system, in accordance with certain aspects of the present disclosure.

Aspects of the present disclosure provide apparatus, methods, processing systems, and computer readable mediums for new radio (NR) (new radio access technology or 5G technology).

NR may support various wireless communication services, such as Enhanced mobile broadband (eMBB) targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra reliable low latency communications (URLLC). These services may include latency and reliability requirements. These services may also have different transmission time intervals (TTI) to meet respective quality of service (QoS) requirements. In addition, these services may co-exist in the same subframe.

Certain multi-beam wireless systems, such as mmW systems, bring gigabit speeds to cellular networks, due to availability of large amounts of bandwidth. However, the unique challenges of heavy path-loss faced by millimeter-wave systems necessitate new techniques such as hybrid beamforming (analog and digital), which are not present in 3G and 4G systems. Hybrid beamforming may enhance link budget/signal to noise ratio (SNR) that may be exploited during the RACH.

In such systems, the node B (NB) and the user equipment (UE) may communicate using beam-formed transmissions. In order for beamforming to function correctly, the NB may need to monitor beams using beam measurements performed (e.g., based on reference signals transmitted by the NB) and feedback generated at the UE. However, since the direction of a reference signal is unknown to the UE, the UE may need to evaluate several beams to obtain the best Rx beam for a given NB Tx beam. Accordingly, if the UE has to "sweep" through all of its Rx beams to perform the measurements (e.g., the UE determines the best Rx beam for a given NB Tx beam), the UE may incur significant delay in measurement and battery life impact. Moreover, having to sweep through all Rx beams is highly resource inefficient. Thus, aspects of the present disclosure provide techniques to assist a UE when performing measurements of serving and neighbor cells when using Rx beamforming.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless System

Figure 8:
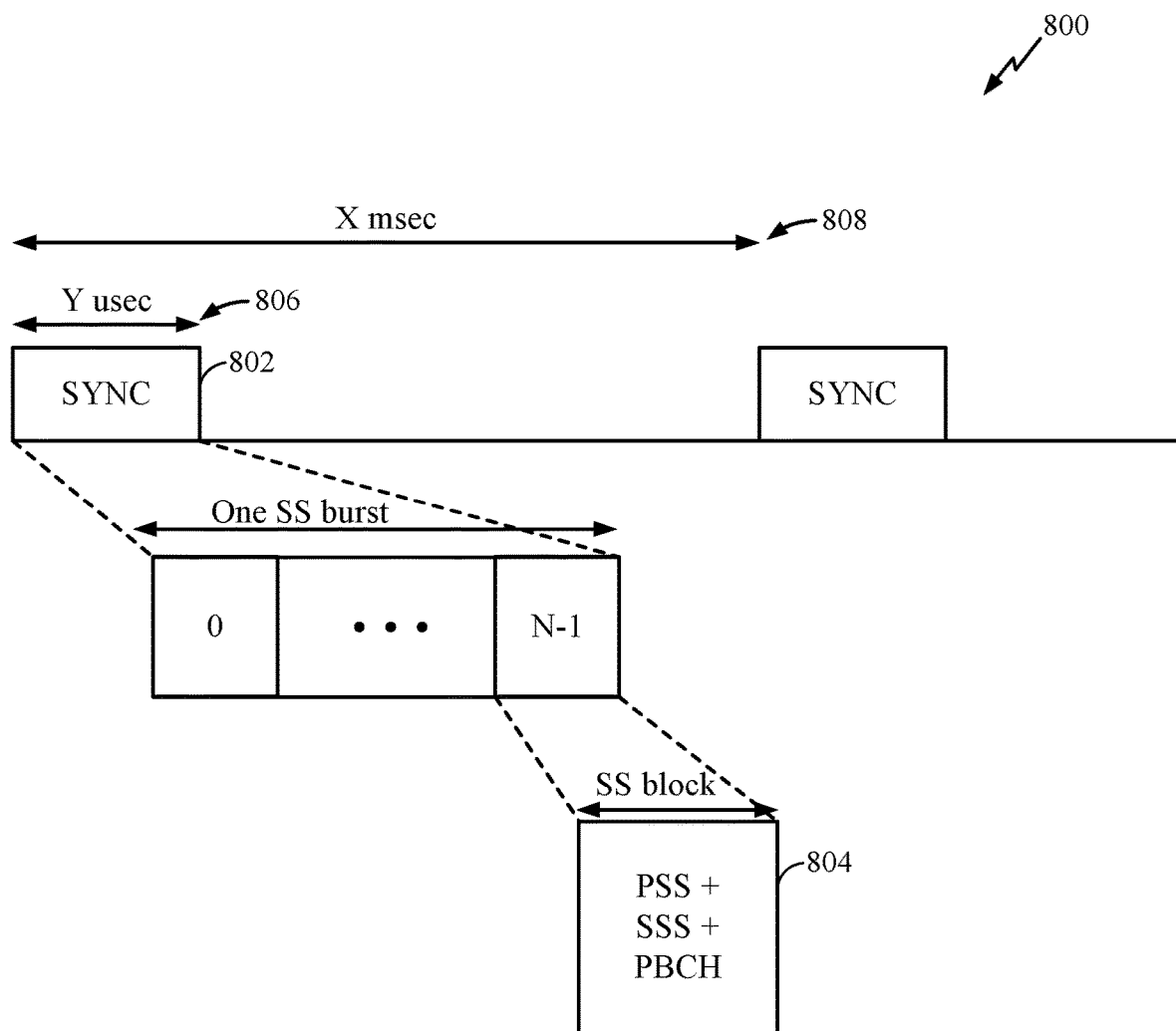
FIG. 8 example transmission timeline of synchronization signal (SS) bursts for a new radio telecommunications system, in accordance with aspects of the present disclosure.

FIG. 1 illustrates an example wireless network 100 in which aspects of the present disclosure may be performed. According to an example, the wireless network may be a NR or 5G network which may support mmW communication. mmW communication depends on beamforming to meet link margin. mmW communication may use directional beamforming, so transmission of signaling is directional. Accordingly, a transmitter may focus transmission energy in a certain narrow direction (e.g., beams may have a narrow angle), as illustrated in FIG. 8. A receiving entity may use receiver beamforming to receive the transmitted signaling.

In order to more efficiently use resources and conserve power when communicating using beamforming, the UEs 120 may be configured to perform the operations 900 and methods described herein for UE receiver beamforming. BS 110 may comprise a transmission reception point (TRP), Node B (NB), 5G NB, access point (AP), new radio (NR) BS, Master BS, primary BS, etc.). The NR network 100 may include the central unit.

As illustrated in FIG. 1, the wireless network 100 may include a number of BSs 110 and other network entities. According to one example, the network entities including the BS and UEs may communicate on high frequencies (e.g., >6 GHz) using beams.

A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and gNB, Node B, 5G NB, AP, NR BS, NR BS, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices.

In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR.

NR may utilize OFDM with a CP on the uplink and downlink and include support for half-duplex operation using TDD. A single component carrier bandwidth of 100 MHz may be supported. NR resource blocks may span 12 sub-carriers with a subcarrier bandwidth of 75 kHz over a 0.1 ms duration. In one aspect, each radio frame may consist of 50 subframes with a length of 10 ms. Consequently, each subframe may have a length of 0.2 ms. In another aspect, each radio frame may consist of 10 subframes with a length of 10 ms, where each subframe may have a length of 1 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., gNB, 5G Node B, Node B, transmission reception point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases, DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
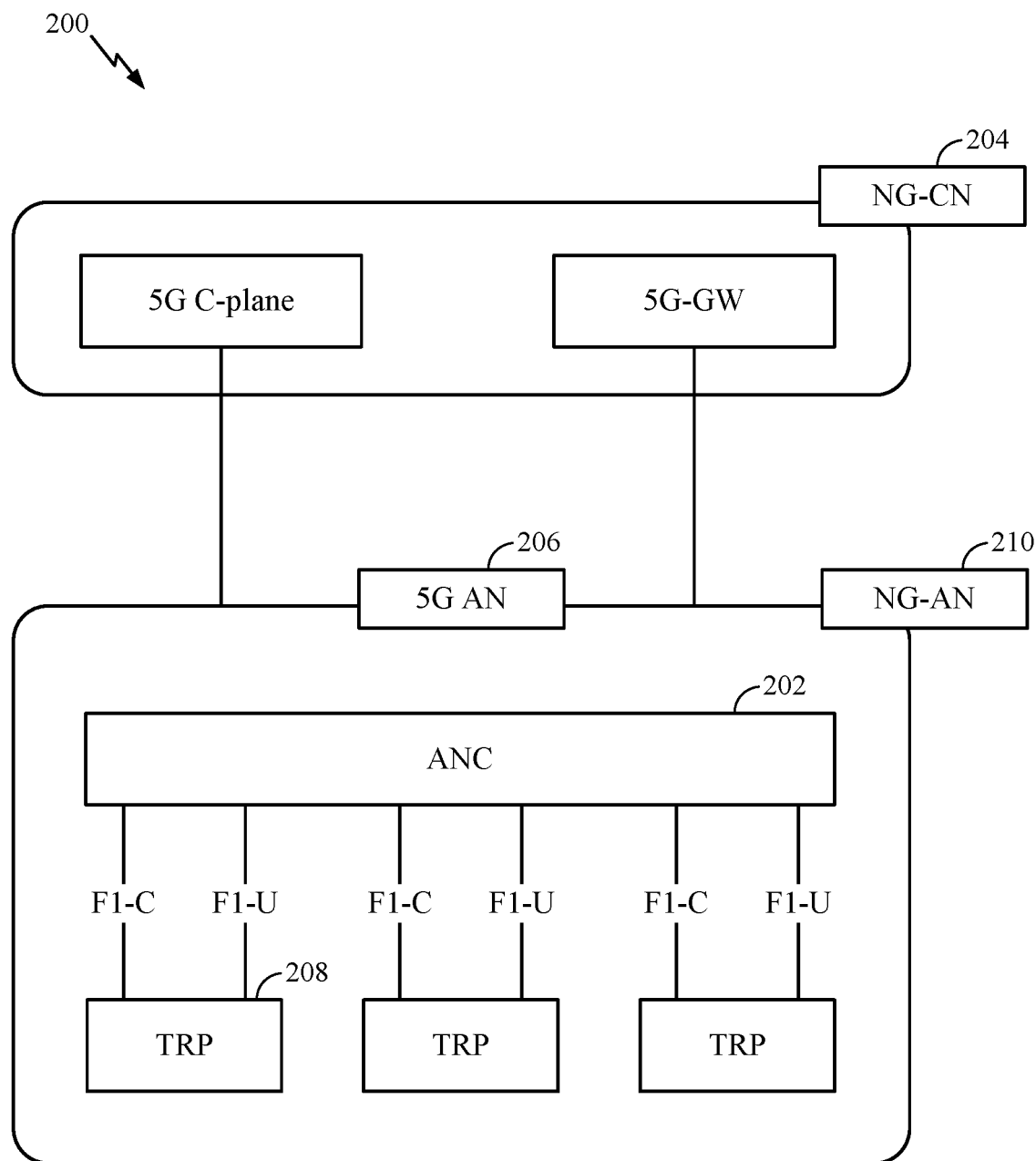
FIG. 2 is a block diagram illustrating an example logical architecture of a distributed RAN, in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG ANs) may terminate at the ANC. The ANC may include one or more TRPs 208 (which may also be referred to as BSs, NR BSs, Node Bs, 5G NBs, APs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 200 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 210 may support dual connectivity with NR. The NG-AN may share a common fronthaul for LTE and NR.

The architecture may enable cooperation between and among TRPs 208. For example, cooperation may be preset within a TRP and/or across TRPs via the ANC 202. According to aspects, no inter-TRP interface may be needed/present.

According to aspects, a dynamic configuration of split logical functions may be present within the architecture 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 202) and/or one or more distributed units (e.g., one or more TRPs 208).

Figure 3:
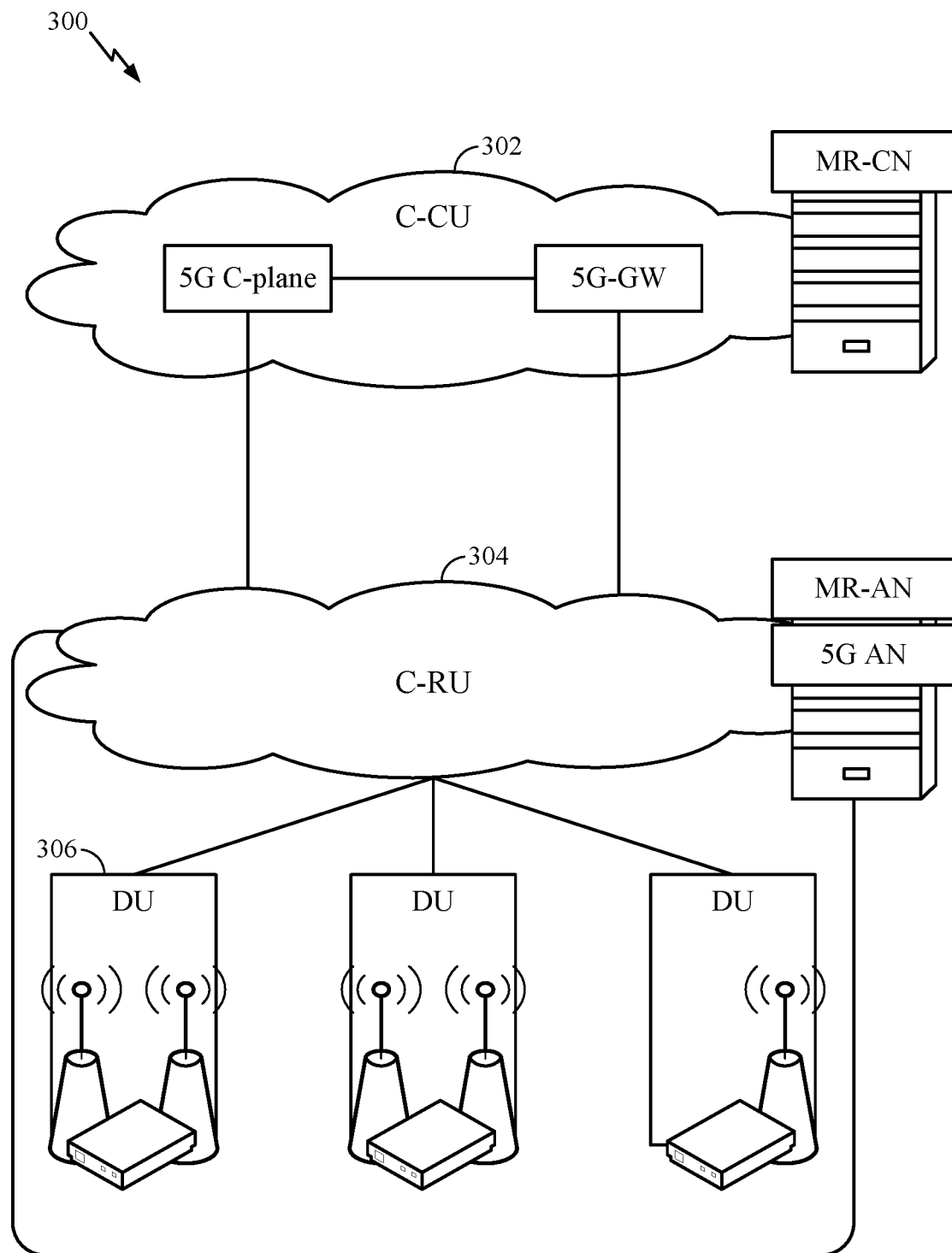
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU may be centrally deployed. C-CU functionality may be offloaded (e.g., to advanced wireless services (AWS)), to handle peak capacity.

A centralized RAN unit (C-RU) 304 may host one or more ANC functions. Optionally, the C-RU may host core network functions locally. The C-RU may have distributed deployment. The C-RU may be closer to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
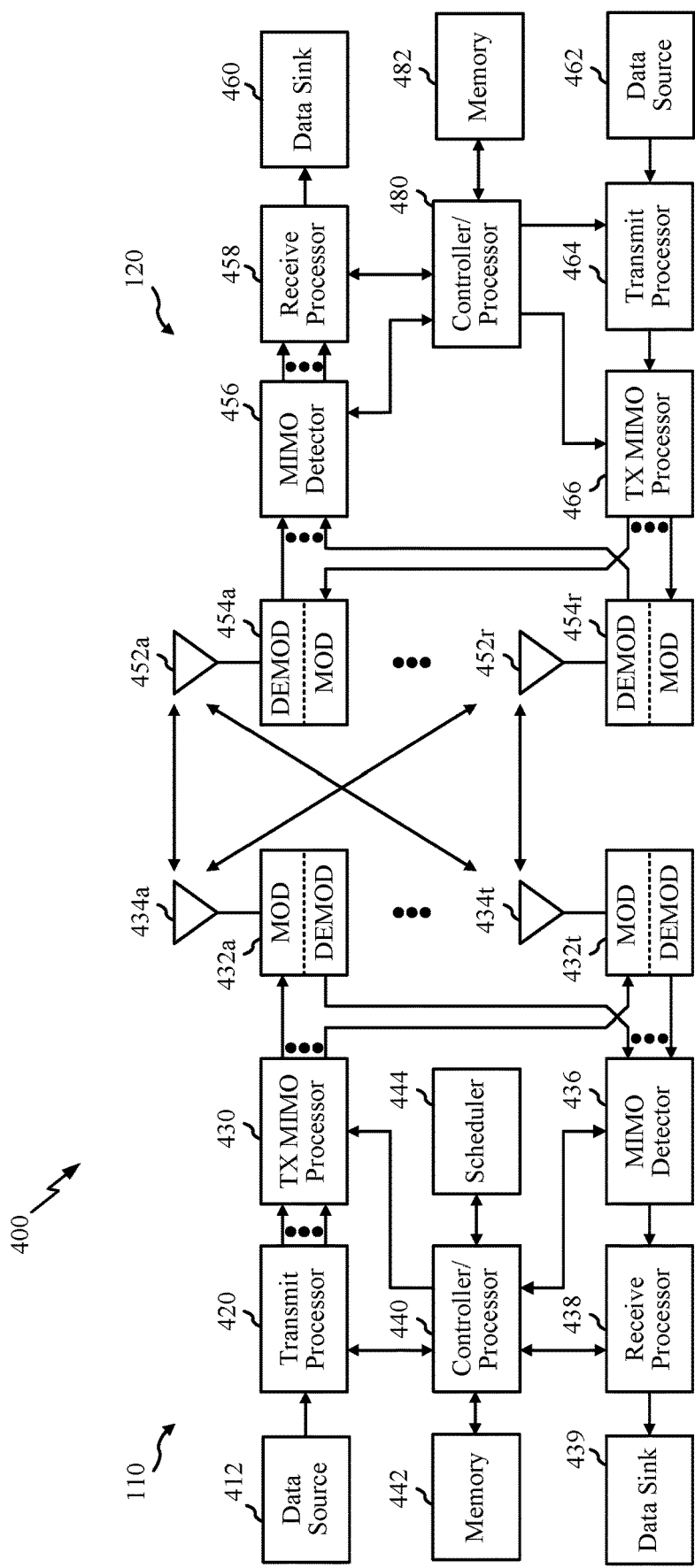
FIG. 4 is a block diagram conceptually illustrating a design of an example BS and UE, in accordance with certain aspects of the present disclosure.

FIG. 4 illustrates example components of the BS 110 and UE 120 illustrated in FIG. 1, which may be used to implement aspects of the present disclosure. The BS may include a TRP or gNB.

According to an example, antennas 452, DEMOD/MOD 454, processors 466, 458, 464, and/or controller/processor 480 of the UE 120 may be used to perform the operations described herein and illustrated with reference to FIGS. 9 and 11-12. According to an example, antennas 434, DEMOD/MOD 432, processors 430, 420, 438 and/or controller/processor 440 of the BS 110 may be used to perform the operations described herein and illustrated with reference to FIGS. 10-12.

As an example, one or more of the antennas 452, DEMOD/MOD 454, processors 466, 458, 464, and/or controller/processor 480 of the UE 120 may be configured to perform the operations described herein for UE beam-based tagging. Similarly, one or more of the 434, DEMOD/MOD 432, processors 430, 420, 438 and/or controller/processor 440 of the BS 110 may be configured to perform the operations described herein.

For a restricted association scenario, the base station 110 may be the macro BS 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. A scheduler 444 may schedule UEs for data transmission on the downlink and/or uplink. The processor 480 and/or other processors and modules at the UE 120 may perform or direct, e.g., the execution of the functional blocks illustrated in FIGS. 9 and 10, and/or other processes for the techniques described herein and those illustrated in the appended drawings. The processor 440 and/or other processors and modules at the BS 110 may perform or direct processes for the techniques described herein and those illustrated in the appended drawings. The memories 442 and 482 may store data and program codes for the BS 110 and the UE 120, respectively.

Figure 5:
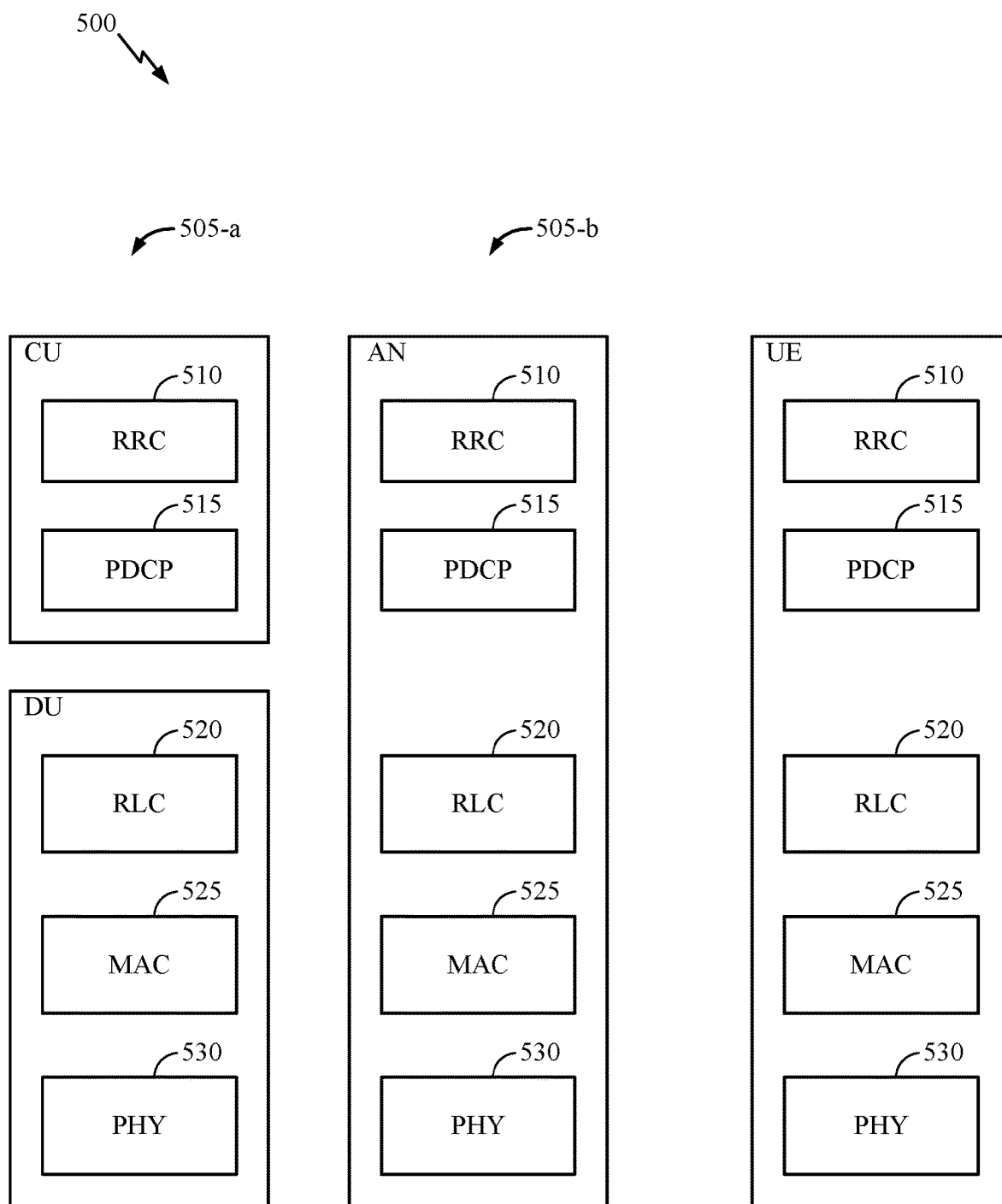
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a 5G system. Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-*a* shows a split implementation of a protocol stack, in which implementation of the protocol stack is split between a centralized network access device (e.g., an ANC 202 in FIG. 2) and distributed network access device (e.g., DU 208 in FIG. 2). In the first option 505-*a*, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-*a* may be useful in a macro cell, micro cell, or pico cell deployment.

A second option 505-*b* shows a unified implementation of a protocol stack, in which the protocol stack is implemented in a single network access device (e.g., access node (AN), new radio base station (NR BS), a new radio Node-B (NR NB), a network node (NN), or the like.). In the second option, the RRC layer 510, the PDCP layer 515, the RLC layer 520, the MAC layer 525, and the PHY layer 530 may each be implemented by the AN. The second option 505-*b* may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

Figure 6:
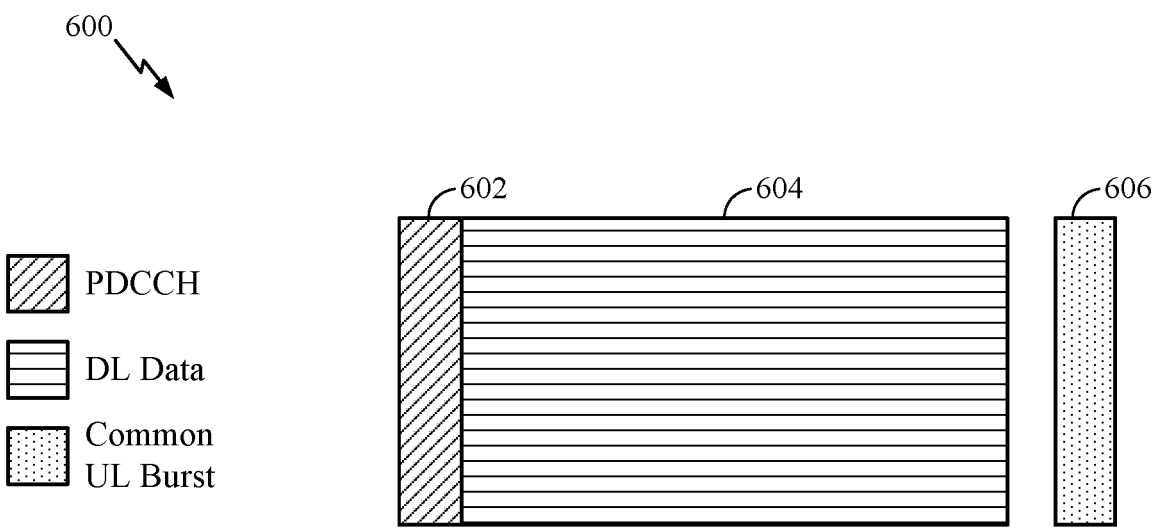
FIG. 6 illustrates an example of a DL-centric subframe, in accordance with certain aspects of the present disclosure.

FIG. 6 is a diagram 600 showing an example of a DL-centric subframe. The DL-centric subframe may include a control portion 602. The control portion 602 may exist in the initial or beginning portion of the DL-centric subframe. The control portion 602 may include various scheduling information and/or control information corresponding to various portions of the DL-centric subframe. In some configurations, the control portion 602 may be a physical DL control channel (PDCCH), as indicated in FIG. 6. The DL-centric subframe may also include a DL data portion 604. The DL data portion 604 may sometimes be referred to as the payload of the DL-centric subframe. The DL data portion 604 may include the communication resources utilized to communicate DL data from the scheduling entity (e.g., UE or BS) to the subordinate entity (e.g., UE). In some configurations, the DL data portion 604 may be a physical DL shared channel (PDSCH).

The DL-centric subframe may also include a common UL portion 606. The common UL portion 606 may sometimes be referred to as an UL burst, a common UL burst, and/or various other suitable terms. The common UL portion 606 may include feedback information corresponding to various other portions of the DL-centric subframe. For example, the common UL portion 606 may include feedback information corresponding to the control portion 602. Non-limiting examples of feedback information may include an ACK signal, a NACK signal, a HARQ indicator, and/or various other suitable types of information. The common UL portion 606 may include additional or alternative information, such as information pertaining to random access channel (RACH) procedures, scheduling requests (SRs), and various other suitable types of information. As illustrated in FIG. 6, the end of the DL data portion 604 may be separated in time from the beginning of the common UL portion 606. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 7:
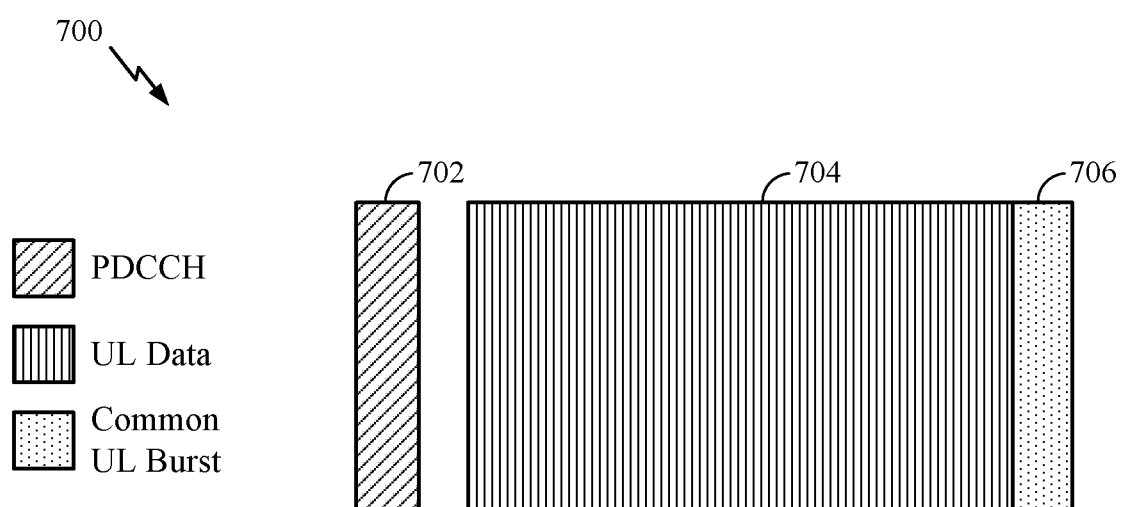
FIG. 7 illustrates an example of an UL-centric subframe, in accordance with certain aspects of the present disclosure.

FIG. 7 is a diagram 700 showing an example of an UL-centric subframe. The UL-centric subframe may include a control portion 702. The control portion 702 may exist in the initial or beginning portion of the UL-centric subframe. The control portion 702 in FIG. 7 may be similar to the control portion 602 described above with reference to FIG. 6. The UL-centric subframe may also include an UL data portion 704. The UL data portion 704 may sometimes be referred to as the payload of the UL-centric subframe. The UL portion may refer to the communication resources utilized to communicate UL data from the subordinate entity (e.g., UE) to the scheduling entity (e.g., UE or BS).

As illustrated in FIG. 7, the end of the control portion 702 may be separated in time from the beginning of the UL data portion 704. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe may also include a common UL portion 706. The common UL portion 706 in FIG. 7 may be similar to the common UL portion 606 described above with reference to FIG. 6. The common UL portion 706 may additionally or alternatively include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Synchronization Signal Block Design

Under 3GPP's 5G wireless communication standards, a structure has been defined for NR synchronization (synch) signals (NR-SS), also referred to as NR synchronization channels. Under 5G, a set of consecutive OFDM symbols carrying different types of synch signals (e.g., primary synchronization signal (PSS), secondary synchronization signal (SSS), time synchronization signal (TSS), PBCH) forms an SS block. In some cases, a set of one or more SS blocks may form an SS burst. In addition, different SS blocks may be transmitted on different beams to achieve beam-sweeping for synch signals, which may be used by a UE to quickly identify and acquire a cell. Further, one or more of the channels in an SS block may be used for measurements. Such measurements may be used for various purposes such as radio link management (RLM), beam management, etc. For example, a UE may measure the cell quality and report the quality back in the form of a measurement report, which may be used by the base station for beam management and other purposes.

FIG. 8 illustrates an example transmission timeline 800 of synchronization signals for a new radio telecommunications system, in accordance with aspects of the present disclosure. A BS, such as BS 110 shown in FIG. 1, may transmit an SS burst 802 during a period 806 of Y μsec, in accordance with certain aspects of the present disclosure. Operations 800 begin, at 802, by transmitting a synchronization signal (SS) burst. The SS burst may include N SS blocks 804 with indices of zero to N−1, and the BS may transmit different SS blocks of the burst using different transmit beams (e.g., for beam-sweeping). Each SS block may include, for example, a primary synchronization signal (PSS), a secondary synchronization signal (SSS), and one or more physical broadcast channels (PBCHs), also referred to as synchronization channels. The BS may transmit SS bursts on a periodic basis, with a period 808 of X msec.

Figure 9:
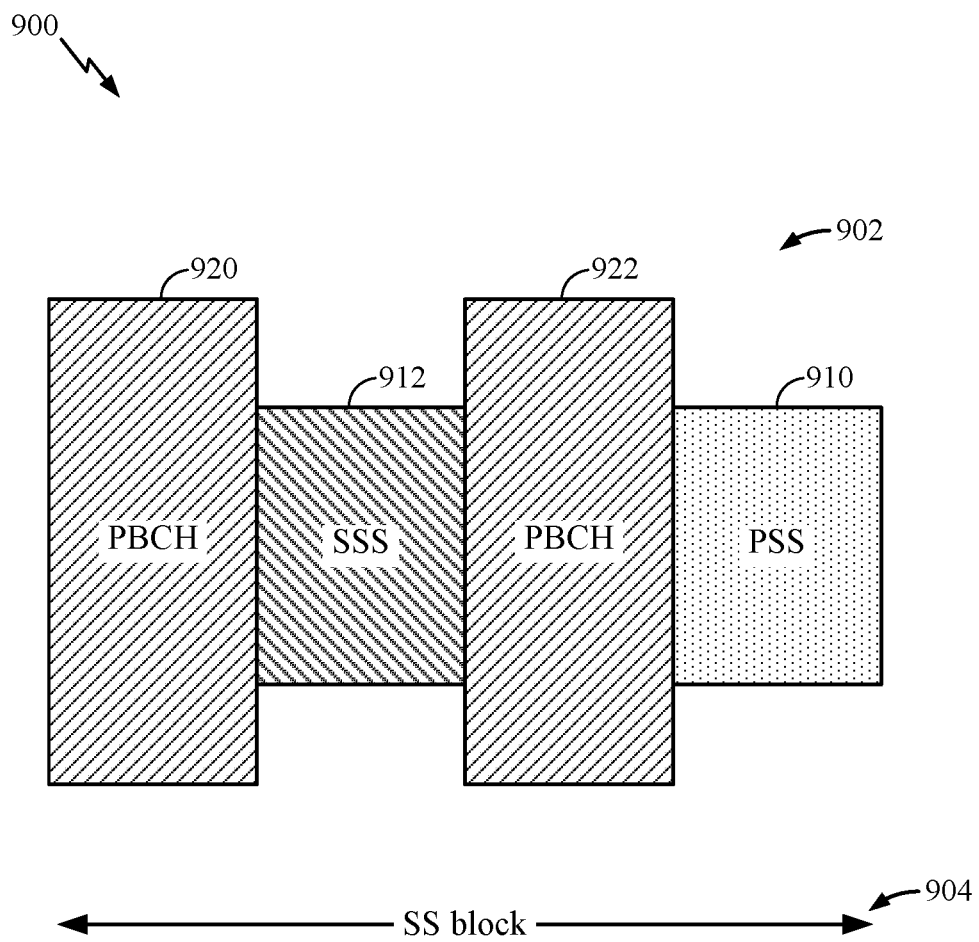
FIG. 9 illustrates an example resource mapping for an exemplary SS block, in accordance with aspects of the present disclosure.

FIG. 9 illustrates an example resource mapping 900 for an exemplary SS block 902, in accordance with aspects of the present disclosure. The exemplary SS block may be transmitted by a BS, such as BS 110 in FIG. 1, over a period 904 (e.g., Y μsec, as shown in FIG. 8). The exemplary SS block includes a PSS 910, an SSS 912, and two PBCHs 920 and 922, although the disclosure is not so limited, and an SS block may include more or fewer synchronization signals and synchronization channels. As illustrated, a transmission bandwidth (B1) of the PBCHs may be different from a transmission bandwidth (B2) of the synchronization signals. For example, the transmission bandwidth of the PBCHs may be 288 tones, while the transmission bandwidth of the PSS and SSS may be 127 tones.

As shown in FIG. 9, SS block consists of PSS, SSS and PBCH (and DMRS for PBCH). These signals are multiplexed in time-domain. There are different synchronization modes: initial acquisition in standalone, initial acquisition in non-standalone, and Synchronization in idle or connected modes.

Example Measurement SS for NR

As described above, for a synchronization channel used for initial access, a UE may assume the SS burst set has a regular transmission period (e.g., 20 ms). In some cases, within the system bandwidth, more than one type of SS blocks may be transmitted in different frequencies at the same time or at different times.

For example, besides SS burst sets for initial access, other SS burst sets can be transmitted to assist UE measurement at other frequencies. These SS burst sets (used for measurement purposes) may not be transmitted at a different periodicity (e.g., 160 ms) and may even be transmitted aperiodically. For example, a gNB may send SS burst sets and signal a neighbor UE to monitor those SS burst sets. In such cases, the neighbor UE may monitor a different bandwidth part (BWP) that does not cover the synchronization channel (used for initial access). In this manner, the gNB can send the additional SS burst set to support intra-frequency measurement from this UE.

Unfortunately, the additional SS block transmission may confuse UEs performing an initial search. In some cases, the SS blocks used for measurement may use a different set of beams (than SS for initial access) and may not have an associated RACH opportunity. If the PBCH in the additional measurement SS blocks points to the same remaining minimum system information (RMSI), those SS blocks may need to use additional bits, for example, to point to a core set of resources (a "coreset") further away. This approach is problematic as it results in an inconsistent number of bits for PBCH (increasing complexity of processing).

Aspects of the present disclosure, however, provide techniques that may help support different SS block transmissions, for example, one used for initial access and one used for measurement purposes. In some cases, the techniques may help distinguish measurement SS block from initial access SS block by using different payloads for PBCH portions of SS blocks. For example, in measurement SS blocks, the PBCH payload may be designed to assist in measurement and also help a UE performing initial access by assisting the UE in locating and receiving the initial access SS blocks transmitted at different times and/or frequencies.

The techniques presented herein may help improve performance of a wireless network and UEs. For example, by providing a burst of measurement SS blocks that are offset in time or frequency from an SS burst used for initial access, aspects of the present disclosure may reduce access delay. For example, a UE detecting the measurement SS blocks may be provided information to help speed detection of the SS block used for initial access. Measurement SS blocks may also lead to enhanced performance at the UE, for example, by allowing coherent combining of beams (used for both measurement and initial access SS blocks) for better detection. Further processing enhancements may be gained, for example, by providing information regarding timing offset from a detected burst or set of measurement SS blocks, which may reduce the number of timing hypothesis for initial access UE.

Figure 10:
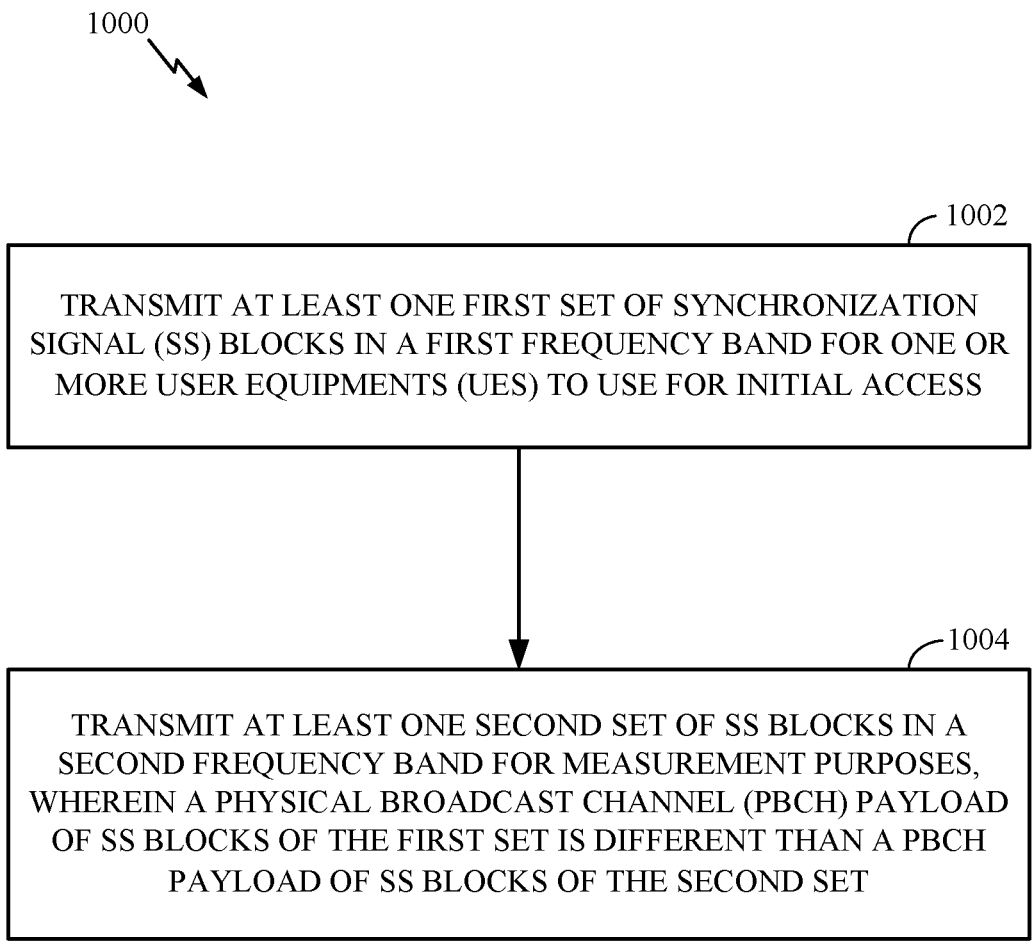
FIG. 10 illustrates example operations that may be performed by a network entity, in accordance with certain aspects of the present disclosure.

FIG. 10 illustrates example operations 1000 that may be performed by a network entity, in accordance with certain aspects of the present disclosure. Operations 1000 may be performed, for example, by a base station (e.g., a gNB) designed to participate in beamformed communications with one or more UEs.

Operations 1000 begin, at 1002, by transmitting at least one first set of synchronization signal (SS) blocks in a first frequency band for one or more user equipments (UEs) to use for initial access. At 1004, the network entity transmits at least one second set of SS blocks in a second frequency band for measurement purposes, wherein a physical broadcast channel (PBCH) payload of SS blocks of the first set is different than a PBCH payload of SS blocks of the second set.

Figure 11:
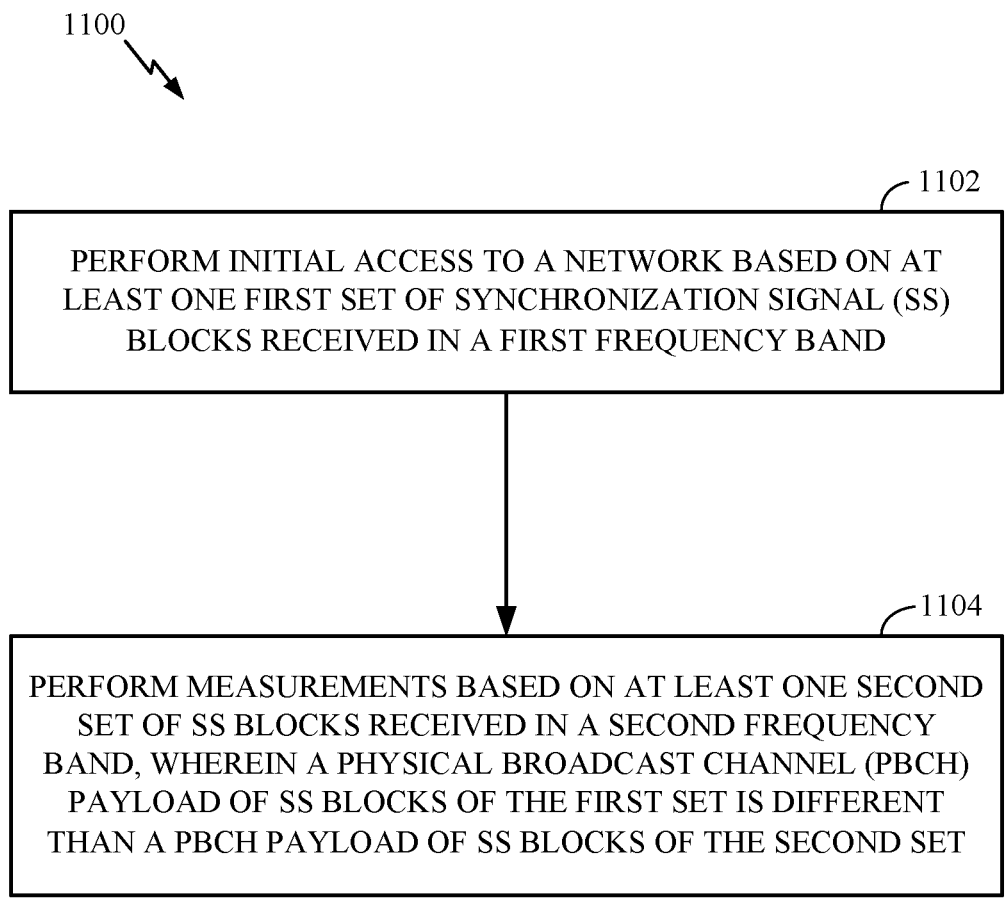
FIG. 11 illustrates example operations that may be performed by a user equipment (UE), in accordance with certain aspects of the present disclosure.

FIG. 11 illustrates example operations 1100 that may be performed by a user equipment (UE), in accordance with certain aspects of the present disclosure. Operations 1100 may be performed, for example, by a user equipment (e.g., UE 120) capable of participating in beamformed communications with a base station (e.g., a gNB).

Operations 1100 begin, at 1102, by performing initial access to a network based on at least one first set of synchronization signal (SS) blocks received in a first frequency band. At 1104, the UE performs measurements based on at least one second set of SS blocks received in a second frequency band, wherein a physical broadcast channel (PBCH) payload of SS blocks of the first set is different than a PBCH payload of SS blocks of the second set.

In this manner, the PBCH payload of an SS block may help distinguish initial access SS blocks from measurement (only) SS blocks (not used for initial access). In some cases, detection of a measurement SS block may indicate a corresponding cell does not provide system information (e.g., a system information block such as SIB1) and, hence, no common coreset.

By using different PBCH payloads to distinguish between different types of SS blocks, effectively the same physical layer structure may be used for both types. In other words, the channel structure discussed above with reference to FIGS. 8 and 9 (PSS/PBCH/SSS/PBCH structure) may be used for both, the PBCH payload may be replaced by a different channel with the same structure (payload size, encoding, modulation, etc.) but different payload content.

As an example, one or more bits in the PBCH payload may be used to indicate whether an SS block is designed to support initial access or to support measurement. In some cases, previously reserved bits may be used for this indication (e.g., a value of 1 may indicate an SS block belongs to a set of SS blocks for measurement purposes). In some cases, a PBCH may have one or more fields to indicate an offset in time and/or frequency between the detected SS block and a reference resource set. For example, in some cases, a PBCH carries a 4-5 bit offset field that indicates a frequency domain offset between a detected SS block and a resource grid (e.g., pointing to an initial corset). By utilizing reserved bits in such a field and/or reserved values (unused combination of bits), a UE may determine a current SS block does not have an associated corset (and cannot be used for initial access), but may contain information to help the UE detect an SS block for initial access (at a different location in time and/or frequency).

A PBCH with payload indicating an SS block is for measurement purposes may be referred to herein as a "measurement PBCH" which does not need to carry master information block (MIB). While the measurement PBCH payload may not need to carry full MIB information, it may carry information useful for measurement. For example, the measurement PBCH payload may carry timing information, such as a system frame number (SFN), SS block index (indicating a position of an SS block within a burst or burst set), or some other type of timing information. This timing information (and/or other additional information) may help a UE performing initial access. For example, a UE who happens to detect a measurement SS block transmission may not initially know the raster is for measurement SS. However, after spending the effort to detect this measurement SS burst, the UE may use the additional information (in the measurement PBCH payload) to assist in acquisition of the initial access SS burst (e.g., making detection of the initial access SS burst easier and/or more reliable).

As noted above, various types of assistance information for initial access UEs may be carried in a PBCH payload of a measurement SS block. For example, such assistance information may include frequency offset (e.g., SS blocks for initial access may be transmitted on a different raster frequency). In some cases, a frequency offset of zero may be considered as a special case where the gNB adds some measurement SS blocks in the same SS raster frequency, but at a different time. Providing measurement SS blocks detectable in the same SS raster (or rasters) frequency may still lead to faster detecting of initial access SS blocks and, thus, faster initial access.

Figure 12:
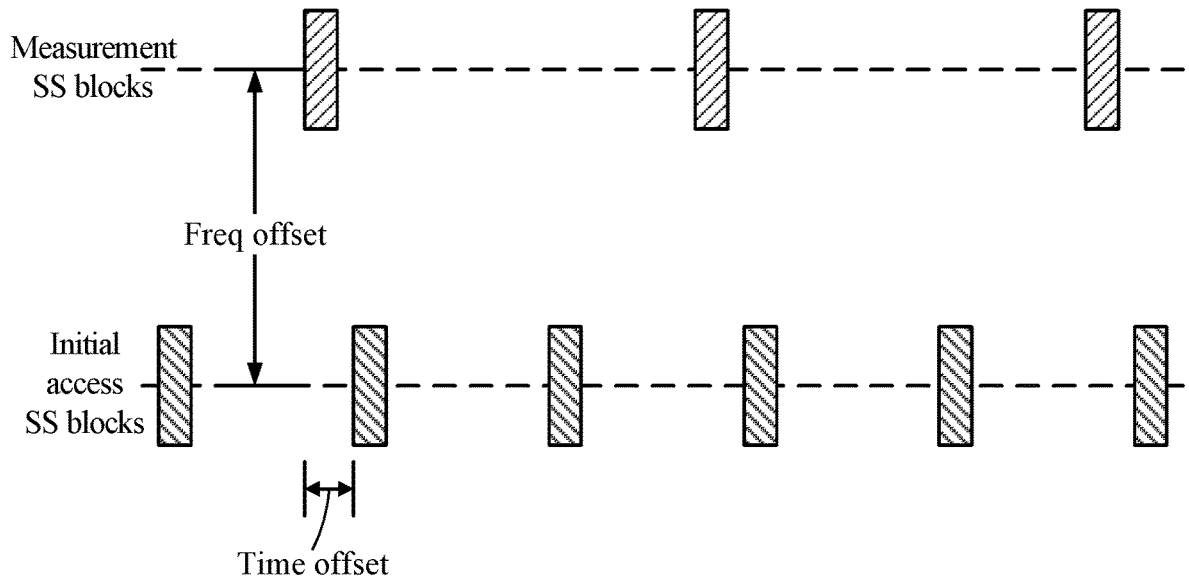
FIGS. 12 and 13 illustrate examples of measurement synchronization signal (SS) blocks offset in time and/or frequency from initial access SS blocks, in accordance with certain aspects of the present disclosure.

As illustrated in FIG. 12, the frequency offset can point to an initial access SS burst set in a different frequency and/or transmitted at different times. For example, in some cases, a measurement SS burst transmitted in a secondary component carrier (SCC) corresponds to (may point to) an initial access SS burst in a primary component carrier (PCC).

As noted above, timing information, such as an approximate timing offset, may also be provided in a measurement PBCH to reduce the number of timing hypotheses for an initial access that a UE needs to evaluate (e.g., the UE may only need to evaluate a subset of all possible timing hypotheses). In such cases, the initial access UE has already found this measurement SS burst set and, therefore, may already have partial timing information (such as OFDM symbol timing and slot timing). Thus, the measurement PBCH payload may only need to provide the remaining timing information.

In some cases, assistance information may indicate an "active" SS block for initial access (e.g., this may be carried in RMSI) to reduce the access delay. For example, in the initial search SS burst set, not all L allowed SS blocks may be transmitted. By providing this information (e.g., such as a bitmap or quantized bitmap-one bit map to multiple SS blocks), together with timing information, the UE may be able to more precisely select the time to search for initial access SS blocks.

In some cases, assistance information may include additional quasi co-location (QCL) information regarding the initial access SS burst set. QCL information generally indicates whether transmitted signals can reasonably be assumed to experience the same or similar channel conditions. Such QCL information may, for example, indicate that an initial access SS burst set transmission can be transmitted using multiple rounds of sweeping of beams. In some cases, the QCL information provided may indicate the period of beam sweeping, which may allow the UE to perform coherent combining of transmissions on different beams for better detection. In some cases, the initial access SS burst set may follow the same beam sweeping pattern as the current measurement SS burst set.

In some cases, for the measurement SS burst set, a different set of beams may be used than the set of beams used for the initial access SS burst set. In some cases, if there is an offset in the beam pattern, the QCL information may provide this offset, which may allow the UE to know which beam it likely will see after finding out the strongest beams in the measurement SS burst set which, again may lead to faster detection of an SS burst for initial access.

In some cases, the physical cell identifier (PCI) can be the same (PSS/SSS) for measurement and initial access SS bursts. Thus, after detection of a measurement SS block burst sets, a UE may not need to evaluate other possible PCI candidates, which may reduce processing overhead. Even if the same PCI is used for transmitting both measurement and initial access SS blocks, different set of beams, different repetition pattern, different set of transmitted SS blocks, and the like. Reusing the same SS burst structure for both, however, as presented herein may avoid confusion to UEs performing initial access.

Figure 13:
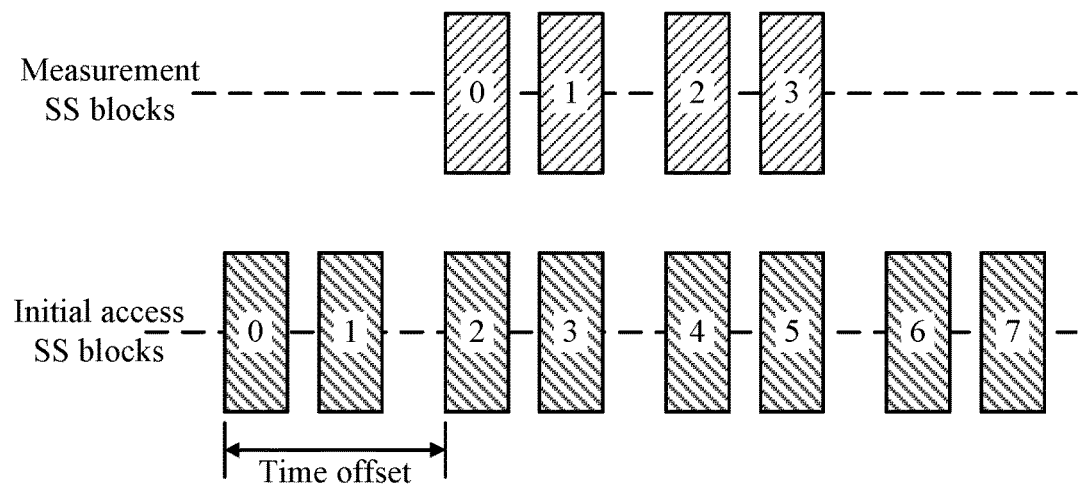

As illustrated in FIG. 13, in some cases, measurement and initial access SS block burst sets may have different relative locations of different SS blocks with different SS block indices. While the SS blocks shown in FIG. 13 (for both measurement and initial access SS blocks) generally align in time, the measurement SS blocks timing does not need to align with the initial access SS blocks timing. In some cases, the timing difference (e.g., represented as an error) may be indicated by an offset in measurement PBCH payload.

In some cases, if the measurement SS block is placed on a frequency different from a (frequency according to a) raster for initial access SS blocks, a UE performing initial access may not attempt to search for it. As a result, in this case, there may be no need to have different PBCH payloads (e.g., the additional bit) to distinguish the initial access SS block and measurement SS block. In other words, the frequency location may effectively distinguish between the two types of SS blocks. In such cases, a UE may only attempt to search for measurement SS blocks when signaled to do so (e.g., by a neighbor gNB).

As described above, by providing a burst of measurement SS blocks that are offset in time and/or frequency from an SS burst used for initial access, aspects of the present disclosure may reduce initial access delay.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module (s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-Ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for perform the operations described herein and the appended figures.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a network entity, comprising:
    transmitting at least one first set of synchronization signal (SS) blocks in a first frequency band for one or more user equipments (UEs) to use for initial access; and
    transmitting at least one second set of SS blocks in a second frequency band for measurement purposes, wherein a physical broadcast channel (PBCH) payload of SS blocks of the first set is different than a PBCH payload of SS blocks of the second set, wherein the PBCH payload of the SS blocks of the second set is configured to:
        assist the UEs in measurement of the second frequency band; and
        assist the UEs in locating and receiving the first set of SS blocks.

2. The method of claim 1, wherein the first and second set of SS blocks are transmitted on different frequency rasters.

3. The method of claim 1, wherein the first and second set of SS blocks are transmitted on same frequency rasters, but at different times.

4. The method of claim 1, wherein:
the second frequency band corresponds to a secondary component carrier (SCC); and
the second set of SS blocks indicate a location of the first set of SS blocks in a primary component carrier (PCC).

5. The method of claim 1, wherein one or more bits of the PBCH payload indicate whether an SS block belongs to the first set or second set.

6. The method of claim 1, wherein the PBCH payload of the second set of SS blocks carries timing information.

7. The method of claim 6, wherein the timing information comprises at least one of system frame number (SFN) or an SS block index indicating a position of an SS block within a burst or burst set.

8. The method of claim 6, wherein:
SS blocks of the first set are transmitted at only a subset of available times; and
the timing information indicates when the UEs should search for SS blocks of the first set.

9. The method of claim 1, wherein the PBCH payload of the second set of SS blocks indicates quasi co-location (QCL) information regarding the first set of SS blocks.

10. The method of claim 9, wherein the QCL information indicates at least one of: a period of beam sweeping used when transmitting the first set of SS blocks, a beam pattern used for transmitting the first set of SS blocks, or an offset into a beam pattern.

11. A method for wireless communications by a user equipment (UE), comprising:
performing measurements based on at least one second set of synchronization signal (SS) blocks received in a second frequency band, wherein a physical broadcast channel (PBCH) payload of SS blocks of a first set is different than a PBCH payload of SS blocks of the second set;
performing initial access to a network based on at least the first set of SS blocks received in a first frequency band; and
using the PBCH payload of the SS blocks of the second set to locate and receive the first set of SS blocks.

12. The method of claim 11, wherein the first and second sets of SS blocks are detected on different frequency rasters.

13. The method of claim 11, wherein the first and second sets of SS blocks are detected on same frequency rasters, but at different times.

14. The method of claim 11, wherein:
the second frequency band corresponds to a secondary component carrier (SCC); and
the second set of SS blocks indicate a location of the first set of SS blocks in a primary component carrier (PCC).

15. The method of claim 11, wherein the UE determines, based on one or more bits of the PBCH payload, whether an SS block belongs to the first set or second set.

16. The method of claim 11, wherein the PBCH payload of the second set of SS blocks carries timing information.

17. The method of claim 16, wherein the timing information comprises at least one of system frame number (SFN) or an SS block index indicating a position of an SS block within a burst or burst set.

18. The method of claim 16, wherein:
SS blocks of the first set are transmitted at only a subset of available times; and
the UE determines, based on the timing information, when to search for SS blocks of the first set.

19. The method of claim 11, wherein:
the PBCH payload of the second set of SS blocks indicates quasi co-location (QCL) information regarding the first set of SS blocks; and
the UE processes the first set of SS blocks based on the QCL information.

20. The method of claim 19, wherein the QCL information indicates at least one of: a period of beam sweeping used when transmitting the first set of SS blocks, a beam pattern used for transmitting the first set of SS blocks, or an offset into a beam pattern.

21. An apparatus for wireless communications by a network entity, comprising:
means for transmitting at least one first set of synchronization signal (SS) blocks in a first frequency band for one or more user equipments (UEs) to use for initial access; and
means for transmitting at least one second set of SS blocks in a second frequency band for measurement purposes, wherein a physical broadcast channel (PBCH) payload of SS blocks of the first set is different than a PBCH payload of SS blocks of the second set, wherein the PBCH payload of the SS blocks of the second set is configured to:
assist the UEs in measurement of the second frequency band; and
assist the UEs in locating and receiving the first set of SS blocks.

22. An apparatus for wireless communications by a user equipment (UE), comprising:
means for performing measurements based on at least one second set of SS blocks received in a second frequency band, wherein a physical broadcast channel (PBCH) payload of SS blocks of a first set is different than a PBCH payload of SS blocks of the second set;
means for performing initial access to a network based on at least the first set of SS blocks received in a first frequency band; and
using the PBCH payload of the SS blocks of the second set to locate and receive the first set of SS blocks.

* * * * *